April 26, 1955　　　A. H. B. WALKER ET AL　　　2,707,262
VOLTAGE REGULATING SYSTEMS

Filed March 3, 1954　　　　　　　　　　　　　2 Sheets-Sheet 1

INVENTORS
ALEC HERVEY BENNETT WALKER,
KENNETH GORDON KING,
BY Robert B. Pearson
ATTORNEY

United States Patent Office 2,707,262
Patented Apr. 26, 1955

2,707,262

VOLTAGE REGULATING SYSTEMS

Alec Hervey Bennett Walker and Kenneth G. King, King's Cross, London, England, assignors to Westinghouse Brake and Signal Company, Limited, London, England Application March 3, 1954, Serial No. 413,887

Claims priority, application Great Britain April 13, 1953

4 Claims. (Cl. 321—19)

This invention relates to voltage regulating systems for maintaining substantially constant the voltage across a load circuit, comprising a magnetic discriminator a direct current control winding of which is connected in a voltage sensing circuit associated with the voltage which it is desired to regulate and has for its object to provide such a system having means for limiting the load current to a predetermined value in such a manner that, so long as the load current does not exceed this value, the apparatus will function to maintain the load voltage substantially constant, whereas should the load current tend to exceed the predetermined value, the apparatus will function to prevent this.

It has previously been proposed to supply direct current to a load circuit from a main rectifier the alternating current terminals of which are connected in series with the impedance winding of a transductor to an alternating current source, the transductor having a first control winding supplied with direct current from a constant current source and a second control winding, opposing the first control winding, connected in series with a bridge connected auxiliary rectifier across the load circuit, the alternating current terminals of the auxiliary rectifier being connected to the output terminals of a current transformer connected in the alternating current feed to the main rectifier, the arrangement being such that the direct current supplied to the second control winding is dependent solely upon the load voltage and functions to keep that voltage constant, so long as the load current is below a predetermined value, whereas when the load current attains that value the current supplied to said second control winding is dependent solely upon the load current and functions to prevent it from rising above that value.

According to the invention, a voltage regulating system of the kind above described is provided in which means for adjusting the voltage across a direct current load circuit is controlled by the output of a magnetic discriminator having a direct current control winding connected in series with a bridge connected rectifier in a voltage sensing circuit responsive to changes in the load voltage, the alternating current terminals of this rectifier being supplied with alternating current proportional to the load current, whereby the output of the discriminator depends upon the load voltage when the load current is below a predetermined value and upon the load current when the latter attains that value.

The means for adjusting the load voltage may comprise a transductor, the direct current control winding of which is supplied in accordance with the output of the magnetic discriminator and the current proportional to the load current being derived from the current flowing in the impedance winding of the transductor.

The transductor may control the output of the booster rectifier of a main and booster rectifier combination, the current proportional to the load current being derived from the alternating current input to the main rectifier.

Alternatively, the magnetic discriminator may be employed to control a motor driven regulator regulating the load voltage the direct current proportional to the load current being derived in any suitable manner.

By the term "magnetic discriminator" is meant control apparatus for alternating current circuits comprising a magnetic core structure upon which are mounted an alternating current winding and a direct current control winding in which the core structure includes a permanent magnet, the core structure and the windings being so arranged that magneto-motive forces of the permanent magnet and the direct current control winding produce a resultant unidirectional magnetic flux in that part of the core structure embraced by the alternating current winding.

The invention is illustrated by way of example in the accompanying drawings, of which:

Figure 1:
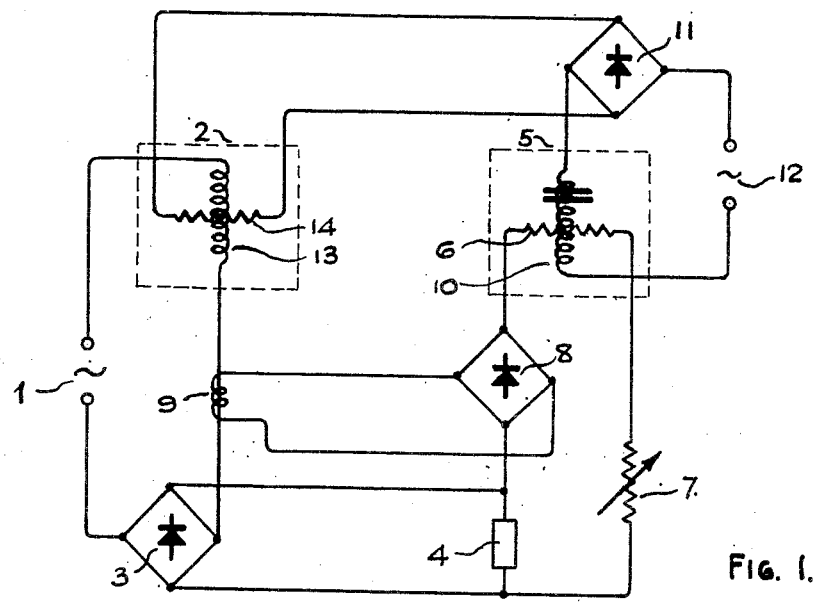
Figure 1 is a circuit diagram of a voltage regulating system illustrating one application of the invention.

Referring first to Figure 1, a load circuit 4 is supplied with direct current derived from an alternating current source 1 in series across which are connected the impedance winding 13 of a transductor 2 and a rectifier 3, the load circuit 4 being connected across the direct current output terminals of the rectifier 3. The transductor 2 has a direct current control winding 14 the magnitude of the current flowing in which determines the impedance of the winding 13 and thus the voltage across the load circuit, in well known manner. The control winding 14 is supplied with energising current from the output of a magnetic discriminator 5 rectified by a rectifier 11. The magnetic discriminator 5 has an alternating current winding 10, energised from an alternating current source 12, and a direct current control winding 6. The control winding 6 is connected in a voltage sensing circuit across the load circuit 4 in series with a resistor 7 and a bridge connected rectifier 8, the latter being so poled as to permit the flow of direct current through the winding 6 in accordance with the voltage across the load circuit 4. Alternating current terminals of rectifier 8 are fed from a current transformer 9 connected in the alternating current circuit of the rectifier 3, thus injecting into the rectifier 8 an alternating current proportional to the load current.

So long as the current in the voltage sensing circuit due to the voltage across the load circuit exceeds the current from the current transformer, the regulating action of the magnetic discriminator depends upon that voltage and, through the transductor 2, tends to maintain it as the desired value. Should, however, the load current rise to such a value that the current injected into the circuit exceeds that due to the load voltage, then the control of the magnetic discriminator is dependent solely upon the increased current and operates through the transductor 2, to prevent the load current from rising above that value.

It is to be understood that, whereas in the foregoing description and in the drawings, the magnetic discriminator 5 feeds the control winding 14 of the transductor 2 directly, it will usually be necessary to include one or more stages of amplification in this feed. Any suitable type of amplifier may be employed, but we prefer to use a magnetic amplifier.

Figure 2:
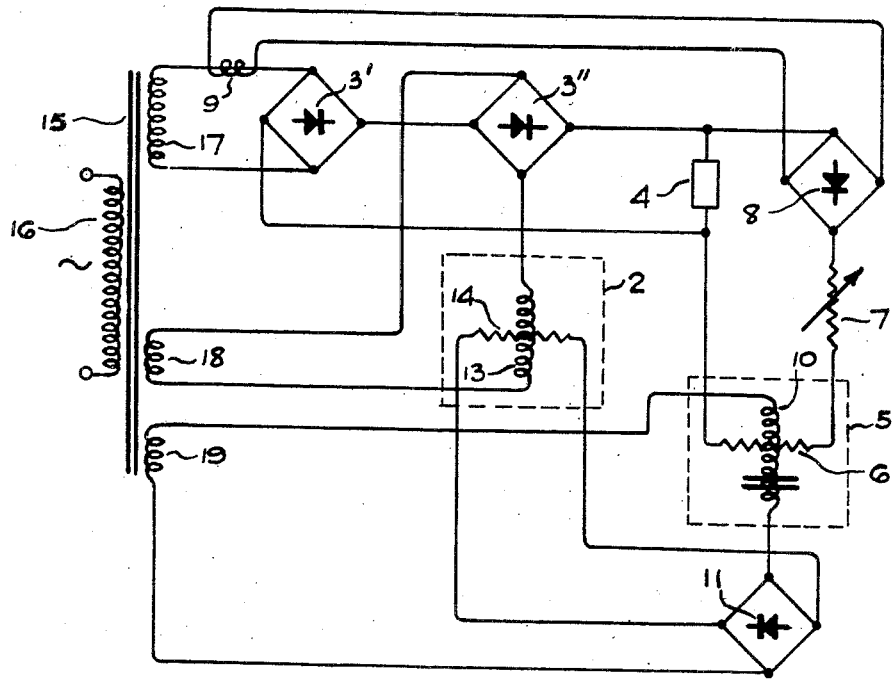
Figure 2 is a similar circuit diagram illustrating another application.

Figure 2 shows the invention incorporated in a voltage regulating system in which the load circuit 4 is supplied with direct current through a main rectifier 3' in combination with a booster rectifier 3" connected in series therewith. In this arrangement, the transductor 2 controls the output of the booster rectifier 3" whilst the current proportional to the load current, which is supplied as before to the alternating current terminals of the bridge connected rectifier 8, is derived from the alternating current input to the main rectifier 3' by means of a suitably connected current transformer 9. In this example the two alternating current sources required for the transductor 2 and the magnetic discriminator 5 are provided by auxiliary secondary windings 18 and 19, respectively of the transformer 16, the main secondary winding 17 of which supplies the load current.

Figure 3:
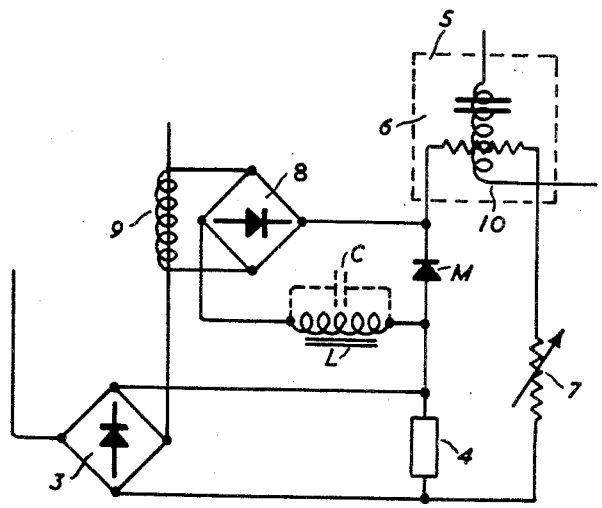
Figure 3 shows a modification of the voltage sensing circuit of Figures 1 and 2.

Due to the fact that the output of the bridge connected rectifier 8 injected into the voltage sensing circuit under over-load conditions is unsmoothed in the two arrangements described above, the response of the apparatus to changes from full load to over-load is apt to be somewhat gradual. This may be counteracted by connecting a capacitor across the direct current terminals of the rectifier but this would entail the use of a capacitor of very large capacitance. An alternative way of dealing with this problem is to modify the voltage sensing circuit in a manner illustrated in Figure 3. In this modification the voltage sensing circuit connected across the load circuit comprises the adjustable resistors 7 and the control winding 6 of the magnetic discriminator 5 connected in series with a half-wave rectifier M across which is connected the bridge connected rectifier 8 in series with an inductive choke device L. A capacitor C may be connected across the choke device L, as shown by the broken lines, the capacitance of which is such as to resonate the choke device at the fundamental ripple frequency of the output of rectifier 8.

Having thus described our invention what we claim is:

1. A voltage regulating system for regulating the output voltage of a main rectifier supplying direct current to a load circuit from an alternating current source, comprising, in combination, a transductor having an impedance winding connected in series with said main rectifier across said source; a control winding on said transductor; a magnetic discriminator having a control winding controlling the output thereof; means for applying said output as direct current to the control winding of said transductor; a bridge connected auxiliary rectifier having alternating current input terminals and direct current output terminals; a voltage sensing circuit including, in series, said control winding of said discriminator and said output terminals of said auxiliary rectifier connected across said load circuit; and a current transformer connected between said source and said main rectifier and having an output winding connected across the input terminals of said auxiliary rectifier, whereby a current proportional to the load current is injected into said voltage sensing circuit.

2. A voltage regulating system for regulating the voltage across a load circuit supplied with direct current from a first alternating current source through a main rectifier connected in series with a booster rectifier, comprising, in combination, a transductor having an impedance winding connected in series with said booster rectifier across a second alternating current source; a control winding on said transductor; a magnetic discriminator having an output winding and a control winding controlling the output thereof; a first auxiliary rectifier having alternating current input terminals connected in series with said discriminator output winding across a third alternating current source and direct current output terminals connected across said control winding of said transductor; a bridge connected second auxiliary rectifier having alternating current terminals and direct current terminals; a voltage sensing circuit including, in series, said control winding of said discriminator and said direct current terminals of said second auxiliary rectifier connected across said load circuit; and a current transformer connected between said main rectifier and said first source and having a secondary winding connected across the alternating current terminals of said second auxiliary rectifier whereby a current proportional to the current supplied to said load circuit through said main rectifier is injected into said voltage sensing circuit.

3. A voltage regulating system for regulating the output voltage of a main rectifier supplying direct current to a load circuit from an alternating current source, comprising, in combination, a transductor having an impedance winding connected in series with said main rectifier across said source; a control winding on said transductor; a magnetic discriminator having a control winding controlling the output thereof; means for applying said output as direct current to the control winding of said transductor; a bridge connected auxiliary rectifier having alternating current input terminals and direct current output terminals; a smoothing choke; a voltage sensing circuit including, in series, said control winding of said discriminator and a half-wave rectifier, connected across said load circuit, said output terminals of said auxiliary rectifiers being connected in series with said smoothing choke across said half-wave rectifier; and a current transformer connected between said source and said main rectifier and having an output winding connected across the input terminals of said auxiliary rectifier, whereby a current proportional to the load current is injected into the voltage sensing circuit.

4. A voltage regulating system for regulating the voltage across a load circuit supplied with direct current from a first alternating current source through a main rectifier connected in series with a booster rectifier, comprising, in combination, a transductor having an impedance winding connected in series with said booster rectifier across a second alternating current source; a control winding on said transductor; a magnetic discriminator having an output winding and a control winding controlling the output thereof; a first auxiliary rectifier having alternating current input terminals connected in series with said discriminator output winding across a third alternating current source and direct current output terminals connected across said control winding of said transductor; a bridge connected second auxiliary rectifier having alternating current terminals and direct current terminals; a smoothing choke; a voltage sensing circuit, including, in series, said control winding of said discriminator and a half-wave rectifier, connected across said load circuit, said direct current terminals of said second auxiliary rectifier being connected in series with said smoothing choke across said half-wave rectifier, and a current transformer connected between said main rectifier and said first source and having a secondary winding connected across the alternating current terminals of said second auxiliary rectifier whereby a current proportional to the current supplied to said load circuit through said main rectifier is injected into said voltage sensing circuit.

References Cited in the file of this patent

UNITED STATES PATENTS

| | | |
|---|---|---|
| 2,634,394 | Kohler | Apr. 7, 1953 |
| 2,673,324 | Burton et al. | Mar. 23, 1954 |